United States Patent [19]

Völker et al.

[11] 4,057,228

[45] Nov. 8, 1977

[54] MIXING OF MATERIALS

[75] Inventors: Martin Völker; Heinz Mühlhoff, both of Langenhagen, Germany

[73] Assignee: Kabel- und Metallwerke Gutehoffnungshutte Aktiengesellschaft, Hannover, Germany

[21] Appl. No.: 545,136

[22] Filed: Jan. 29, 1975

[30] Foreign Application Priority Data

Jan. 30, 1974 Germany .............................. 2404292

[51] Int. Cl.² .............................................. B29B 1/06
[52] U.S. Cl. ........................................ 366/79; 318/98; 318/474; 318/332
[58] Field of Search ............... 259/DIG. 19, 185–195, 259/9, 10, 8, 25, 26; 318/98, 99, 332, 474, 472; 324/142; 425/107, 108

[56] References Cited

U.S. PATENT DOCUMENTS

| | | | |
|---|---|---|---|
| 2,595,373 | 5/1952 | Stewart | 324/142 X |
| 2,596,672 | 5/1952 | Gard et al. | 318/474 X |
| 2,689,321 | 9/1954 | Vogel | 318/474 |
| 3,237,241 | 3/1966 | Gagliardi | 259/192 |
| 3,375,717 | 4/1968 | Impellizzeri et al. | 324/142 |
| 3,447,201 | 6/1969 | Seanor et al. | 259/191 |
| 3,655,955 | 3/1972 | Brendle | 324/142 X |
| 3,731,190 | 5/1973 | Schwendtner | 324/142 |
| 3,797,808 | 3/1974 | Ma et al. | 259/191 |
| 3,825,235 | 7/1974 | Schwertfeger et al. | 259/191 |
| 3,888,470 | 6/1975 | Leisenberg | 259/191 |
| 3,951,389 | 4/1976 | Porter | 259/DIG. 19 X |

Primary Examiner—Robert W. Jenkins
Attorney, Agent, or Firm—Ralf H. Siegemund

[57] ABSTRACT

Powderous, granular, and/or liquidous substances such as thermoplastic or elastomeric materials are mixed with each other or with fillers, additives, etc. in that the mixing operation is continued until a predetermined amount of mixing work has been expended. The mixing operation can be controlled as to its entire duration on that basis as well as with regard to completion of intermediate steps.

6 Claims, 1 Drawing Figure

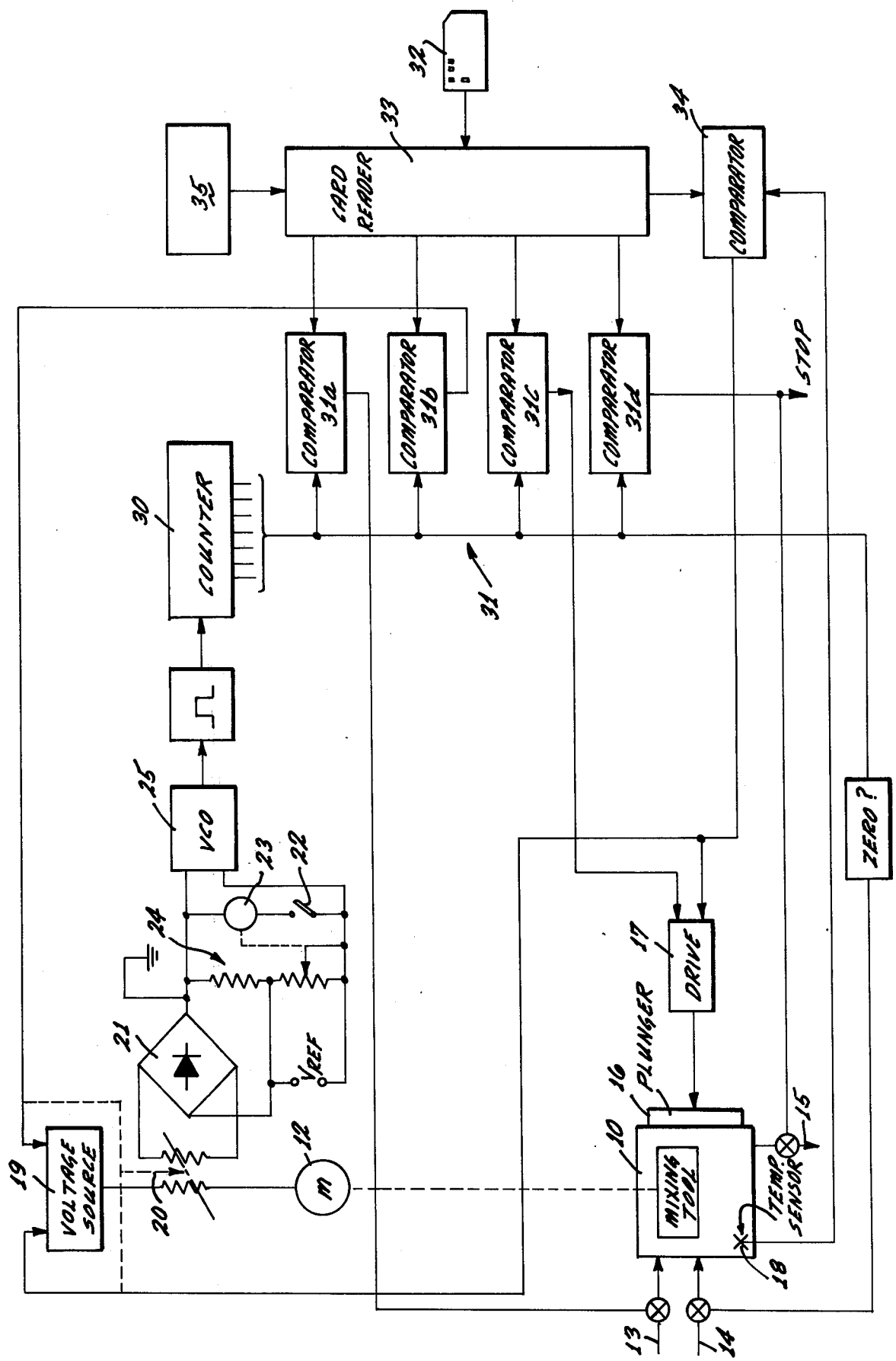

MIXING OF MATERIALS

BACKGROUND OF THE INVENTION

The present invention relates to the mixing of substances e.g. thermoplastic material or elastomeric materials, possibly under inclusion of fillers, accelerators, lubricants, etc. whereby particularly a mixer is charged with the components to be mixed therein to obtain a mixture which is as homogenic as possible.

Whenever components are to be mixed for any purpose it is usually required that they be mixed quite intimately to obtain a homogenic mixture. For this, a mixing chamber is charged, either in the beginning of a mixing step or during mixing if necessary or so provided for. The chamber contains rotating mixing elements constructed and operating to obtain a homogenic mixture. Of course, the construction of these elements depends on the nature and consistency of the charges.

Generally speaking, these rotating mixing tools will (1) crush fragmentizes and grind the (solid) charge to obtain a granular or powderous state or (2) soften the (liquidious) material so that the substance assumes low viscosity (masticating). These two steps can be deemed preparatory as they depend greatly on the original physical state of the respective raw material. Moreover, these preparatory steps may have to be carried out prior to mixing, involving the substances alone whereby, however, the mixing tool may already be used. Following preparation, the tools should intimately mix the granulated material, possibly under additional grinding of the particles, fragmenting and breaking them into smaller size to obtain a still more powdery state of at least some of the different components to be mixed, so that surface portions of freshly cleaved particles are brought into mixing engagement with newly broken up particles of another component and vice versa to obtain ultimately a very homogenic mixture.

Obviously, homogeneity of a mixture depends on the average particle size and its volume, and also on the size distribution; a mixture to be as homogenic as possible requires that particle volume and size be decreased as much as possible. The mixing operation requires expenditure of mechanical work, specifically shearing work, dominating for slowly running tools, but predominantly kinetic energy is consumed for fast running tools. The work expended and energy consumed in this process is converted primarily into heat due to internal and external friction. That heat has to be removed, basically from the outside and through the powder itself. Since powdery substances are usually inherently poor thermal conductors, the heat removal process is quite limited. Thus, uncontrollable and undesirable hot spots could arise inside of the mixture. Such hot spots may result in undesired chemical reactions. For instance, one of the components may be a component that cross-links if a particular temperature is exceeded. If in fact a local hot spot temperature exceeds that limit above which cross-linking begins the material undergoes locally a change in consistency not wanted at that point. Previously, it was practiced to sense a maximum temperature (below any critical limit) and to shut the mixer off to permit its cooling. Obviously, mixing has to continue to obtain the desired degree of homogeneity, because if mixing is to be stopped entirely just because the mixer became too hot, the mixing state becomes rather arbitrary. Moreover, the temperature of the material to be mixed can only be determined locally, or on the outside, but not everywhere inside of the substance. Since ambient conditions may vary they modify the heat removal accordingly.

The mixing of substances has generally been carried out on the basis of predetermined mixing times. Obviously, if the mixer has to be shut down, mixing has to be extended. One has also tried to use the motor power as a criterium for the duration of mixing, but that was not satisfactory.

DESCRIPTION OF THE INVENTION

It is an object of the present invention to provide for a supervisory control of mixing several components so as to be assured that the desired homogeneity has been obtained, even if the properties of the raw materials and charges differ.

It is another object of the invention to develop and utilize a criterium other than mixing time for determining homogeneity of mixing.

The invention is based on the discovery that the expended work for mixing is a very reliable indicator as to the state of mixing attained, particularly in the sense of providing for reproducible results. Once it has been ascertained emperically that a particular mixer provides a homogenic mixture meeting particular specifications, after having expended a particular amount of mixing work, one knows that the same mixer will provide again a mixture meeting these specifications when having expended the same amount of work.

Thus, in furtherance of the invention it is suggested to track the expended work in a mixture and to control the duration of mixing in response to the work expended. One will preferably ascertain torque, force and/or power and integrate this measured quantity to track the expended work, preferably by means of pulse counting. The mixing power and work is ascertained by subtracting the power, torque or force of the mixer when not charged, from the corresponding quantity when having been charged and actually mixing, grinding, etc.

Developing the invention further, it should be mentioned that a particular quantity of a particular substance e.g. of very coarse consistency, or even individual pieces thereof, will be ground into a particularly fine granular or powderous state and having a particular grain size distribution as well as a particular average particle size, after a particular "mixing" tool has ground the raw charge under expenditure of a specific amount of work. That work is expended actually for fragmentizing, crushing and grinding the charge but should conveniently be termed also as mixing work. The charge is actually mixed with itself. The same is true with regard to viscous substances. A particular amount of mixing work expended masticates the substance to a particular (reduced) viscosity. Thus, the invention is applicable also to the preparation of charges for mixing.

In the general sense, therefore, the invention does not only render the overall completion of mixing dependant upon expenditure of a particular amount of work, but intermediate, more or less preparatory steps (fragmentizing, grinding, masticating) are likewise deemed completed when a particular amount of work has been expended. In each instance there is a definite relation between the work and the state of the substance upon which such an amount of energy has been exerted by mechanical work and with the particular tool.

It was found that the invention, in fact, increases throughput and consistency of quality of mixing. Undue heating can be readily prevented e.g. by slowing the mixing process in dependance upon temperature. Significantly that will reduce the power (and rate of heat development) but the supervisory control through metering the needed work, extends the mixing time and duration so that the desired homogenic state will be reached with certainty. Thus, cross-linking or decompositioning or other undesired changes are avoided.

The simple tracking of expended work and controlling duration and, possibly, intensity of mixing on that basis permits ready adaptation to different conditions, charges and substances. The work needed to obtain a homogenic mixture is, as stated above, empirically ascertained and one can readily hold available a large variety of different work and energy reference values to be used by the same or the same type of equipment for different charges or changed conditions.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE is a schematic view and block diagram of a system for practicing the method in accordance with the preferred embodiment of the invention.

Proceeding now to the detailed description of the drawings, the FIGURE shows a mixing vessel 10 with a mixing tool 11 driven by a motor 12 which is shown external to the vessel but could be located inside thereof. The vessel has two inlets 13 and 14 which are shown as valve controls, but they may be gates or other controlled ports, hopper outlets etc. for governing feeder paths into the vessel for the components to be mixed. These components may be dispensed from hoppers by gravity or they may arrive on vibrating conveyors, shaking shoots or the like. If any of the components are liquidous, flow metering, pumps etc. they may be included in the inlet paths.

The vessel 10 has a valve or gate controlled discharge outlet 15 to be operated upon completion of mixing. In addition, the vessel 10 contains a plunger 16 controlled e.g. hydraulically or by any other suitable drive 17 to obtain a reduction in volume of the mixing chamber so as to intensify or relieve e.g. the crushing and grinding operation. A temperature sensor 18 is disposed at a suitable location inside of the vessel to ascertain the medium temperature of the content.

The motor 12 is supplied from a source 19 with operating voltage, e.g. multiphase voltage, and motor 12 may, for example, be an asynchronous motor. Generally speaking, the source 19 may include circuitry for speed control of the motor. In order to ascertain the work expended by the motor in the mixing chamber of vessel 10, it is convenient to ascertain the electric power fed to the motor. If and as long as the supply voltage is constant the power is proportional to the current. Therefore, a pickup transformer 20 with a primary connected serially in one of the current paths to the motor senses the motor current. A rectifier 21 is connected to the secondary winding of the transformer to provide for a d.c. voltage which is proportional to the motor current and, for constant supply voltage, proportional to the power as provided to and consumed by the motor.

The power so indicated is not directly the power as exerted by the mixer but includes internal losses, losses by the mixer itself due to friction in the bearings etc. The work and energy expended i.e. the time integral of power is likewise divided in that manner. Thus, in order to ascertain true mixing power and work it is necessary to run the mixer idle with no charge in the vessel, and to subtract later this loss from the actual power expended to obtain "mixing power".

A circuit 24 comprised of a resistor, a potentiometer and a reference voltage compares the voltage drop across the potentiometer with the output voltage of rectifier 21. A servo motor 23 responds to the difference (switch 22 being closed) and adjusts the potentiometer slide or tap to reduce the difference between the voltages to zero, in closed loop operation.

Thus, the motor current now sensed is the idle current which is indicative of the power (and work) which is not mixing power (and work). The potentiometer adjustment and the resulting voltage there across represents the idle power and is held for further use. Please note, that voltage times current represents power in each instance.

In the normal or operating mode switch 22 opens, and now the rectifier output is applied to the now open loop operation of algebraic subtraction circuit 24. Therefore, the output of the subtracting circuit is directly indicative of the mixing power, which is still zero as long as the mixer is not charged.

In order to ascertain the mixing work, a voltage controlled oscillator 25 is connected to receive the subtraction signal to generate an oscillation whose frequency is directly proportional to its input. A squaring circuit 26 converts the a.c. signal into a sequence of pulses which are fed to a counter 30.

The counter will be reset to zero in the beginning. As long as no charge is contained in vessel 10, subtraction circuit 24 provides zero output, so that VCO 25 does not provide any signal that can be converted into a pulse sequence; counter 30 remains at count state zero as mixing work is not performed at that point.

As soon as the mixing tool encounters resistance mixing work is expended. It should be noted, that we use for convenience the term mixing work even if the mixer does not actually mix but, for example, just stirs or grinds a charge. Thus, any work performed as the mixing tool encounters resistance (other than air) is termed mixing work.

Thus, as soon as the mixer expends mixing work as defined, the power supplied to motor 12 goes up and VCO 25 will begin to provide signals which are counted in counter 30, so that the counter actually meters work and energy that is being expended and consumed. In accordance with the basic concept of this invention, the work performed is used to control the mixing operation, at least as to certain aspects thereof including particularly duration. For this, a circuit 31 is provided which ascertains when specified amounts of work have been performed and expends.

The circuit 31 includes a plurality of digital comparators 31a, b, c, d each of which receiving the progressing count numbers from counter 30 and compares them with a preset input numbers. Upon agreement, the respective comparator issues a signal to perform certain switching operations to be performed after the mixer has completed a specified amount of work as identified by the preset input of the comparator.

Presetting of the several comparators may be carried out e.g. by means of punched control cards as symbolically indicated with numeral 32. A card reading device 33 with feelers or the like scans an inserted card and presets the inputs for comparators 31a to d, to be used as reference and command inputs. The card - card reader system presets in addition the reference input for a temperature comparator 34 which receives the output of sensor 18 as input to be compared with the card reference. The sensor input may additionally be provided with an analog to digital converter, or the reference input is provided with a digital to analog converter.

As stated above, the invention is based on the proposition that a particular state of mixing and/or a particular degree of granulation or powderization will in fact be obtained if a particular amount of energy (work) has been expended by the mixer. These values have to be ascertained emperically in a manner to be described later, and they are representatively stored on these command and reference value or control cards 32.

As schematically represented by block 35 the process may be subjected to other disturbances, interferences or even intentional changes. In each such instance, the reference numbers as applied by device 33 may be modified; in most instances this modification may amount to an extension of the mixing time needed.

A work cycle may be carried out as follows. At first, it is presumed that the mixing chamber 10 is empty, and the "unusable" power is ascertained in that for closed switch 22 the potentiometer in circuit 24 is adjusted to equal the output voltage of rectifier 21. Switch 22 is opened and the circuit continues in open loop as subtracting circuit. The counter will be reset to zero on opening of switch 22 while count-state zero is maintained in open loop as long as the load on the mixer is not varied. Count state zero when maintained for a particular period of time will be used as a signal representation for opening the valve or hopper gate in input 14 so that the mixer is charged with the first component.

It may be assumed that the material charged consists of rather large pieces or is of very coarsely granular consistency and has to be brought first into a mixable form and state. Therefore, it is presumed that the mixer runs at first at a rather low speed (low motor voltage) to run primarily as grinder. The amount of work needed to fragmentize and grind the charge into a finer granular and powderous or near powderous form has been previously ascertained and serves as the command input for comparator 31a. As soon as the charge entered the mixing chamber, work is expended for grinding the charge, and circuit 24 provides a non-zero voltage, so that counter 30 begins to count and thereby integrates the mixing power to obtain a numerical representation of the work.

The work metering by counter proceeds until reaching a number which equals the reference and command value of circuit 31a. This reference number is indicative of completion of this preparatory grinding step and circuit 31a responds and, for example, opens the hopper gate of inlet 13 so that the second component, presumed to have rather fine consistency already, is added to the charge.

The two components are now mixed to some extent, but dominating at this point is still shear work, for grinding the still rather coarse particles into a more powdery state. The operation is still carried out at low speed. The grinding work still needed is likewise a known quantity. One could proceed in two different ways. The counter 30 may just continue to run, and the shear work expanded may now be just added to the work that was expended on the first component alone. The command input as effective as comparator 31b will thus be a number that equals the number of reference input for 31a plus the work needed for pulverizing the two components together. Alternatively, counter 30 may have been reset to zero while comparator 31a is being deactivated. In this case, the command and reference input for circit 31b will be just the shear and grinding work need to pulverize the two components, together in the chamber.

The response of circuit 31b serves as control for the motor speed, to increase the voltage so that the speed of the mixer will increase to obtain high speed mixing. In order to be fully consistent, a change should also be made in the power sensing circuit, e.g. the transformer (20) ratio could be changed to maintain consistency in the representation of power, as far as the output of rectifier 21 is concerned. However, it should be noted that the purpose of the invention is not the acquisition of absolute values concerning power. The purpose of the invention is to ascertain when a particular amount of work has been performed, the numerical representation and scale for that amount is of secondary importance. Thus, any change in the current sensing circuit may not be necessary, and even though counter 30 may now advance at a slower rate than would be correct, this aspect simply can be considered in the determination of the specific count number that serves as reference value for comparator 31d to indicate when the high speed mixing operation is completed. Thus, comparator 31d is the sensor for the amount of work needed to mix the components completely and intimately so as to obtain the desired degree of homogeneity. As comparator 31d responds, the outlet 15 is opened and the vessel 10 will be discharged. Additionally, or alternatively, the mixer is stopped either following complete discharge of the mixing chamber or for purposes of discharging the chamber otherwise.

At some point (or several points) in the mixing operation, it may be advisable to change the position of plunger 16. One or several comparators 31c may be provided for this purpose to be triggered in each instance following the expenditure of specified amounts of mixing energy and work thus far. However, the plunger operation should be made additionally dependant upon temperature in that the plunger relieves the pressure on the powder to some extent if the temperature exceeds the preset reference limit as applied to comparator 34. Thus, the output of comparator 34 is used as additional input for plunger position control and drive 17.

In addition or in the alternative, the mixer may be caused to slow down when the content of the mixing chamber tends to become too hot. Thus, the output of comparator 34 may be applied to the power supply 19 to reduce e.g. the voltage for the mixer motor 12. However, in this case it will be necessary to gang the voltage change with the current sensing transformer 20, to maintain consistency in the measuring of power. These speed and power changes in the motor on account of excessive temperature are unforeseeable and cannot be taken into account for the determination of reference numbers for response of circuit 31. Having to provide for this change in the power sensing circuit, it can also be used to obtain the aforementioned transformer ratio change for any change in the motor voltage supply.

The example above is representative of the best mode of carrying out the invention. Modifications thereof are for example the following. First of all, the principle of the invention is not limited to the mixing of granulated and powderous material. Rather, liquidous components (or liquid and powder) can be mixed. Grinding work may be replaced here by musticating one or both components to reduce viscosity. This is also ascertainable and determinable in terms of work expended for a given quantity.

Another aspect here is that the mixing can be controlled additionally by adding one of the components in steps or continuously at a slow rate, using here the progressing work as expended to control these additions, so that the concentration of that component in the mixture is more or less gradually increased under conditions of a continuously maintained quasi-homogenic state of the mixture.

The work as expended can be tracked and ascertained differently. One can, for example, determine speed and torque separately e.g. through strain gauges and convert the measuring signal into a pulse sequence as described. In this case, power and work is determined independantly from the mode of driving the mixer. Hydraulic pneumatic or other sensing can also be used. It is, however, practical to present the measured value at some point as an electrical signal.

The control cards 32 can be prepared while using the equipment for processing test charges and determining by way of more or less frequent sampling what state of mixing, grinding, viscosity, homogeneity etc. has been reached for the amount of work expended thus far. When sufficiency of the respective parameter has been ascertained, the respective count number of counter 30 is read and punched into card 32 as reference for further operation. Different cards can be prepared here for different quantities and different kinds of materials as well as for different states and consistency of the raw charges.

The digital method has the particular advantage, in that the mixing can be interrupted at any time, necessitated for instance because of interference, break down of equipment etc. The state of mixing is represented by the count state at the interruption, and the operation can be resumed from precisely that count state, which may have to be stored elsewhere until the disturbance has been removed, parts replaced etc.

It should be mentioned that the initial phase of sensing the no-mix work could be automatically terminated by resetting the counter 30 on each count pulse while the servo 23 operates. When the count state zero has been maintained for a certain period of time potentiometer adjustment has been completed, switch 22 can be opened and the first charge begins.

The invention is not limited to the embodiments described above but all changes and modifications thereof not constituting departures from the spirit and scope of the invention are intended to be included.

We claim:

1. In an apparatus for mixing materials which includes a mixing chamber, a mixing tool, and a motor driving the mixing tool, the improvement comprising:
    first means connected to the motor to derive therefrom a signal representative of the power consumption of the motor during operation under mixing load;
    second means providing a correcting signal representing power consumption of the motor when driving the mixing tool, but without mixing and being connected to the first means to provide a signal representing the difference between the signal as provided by the first means and the correcting signal;
    third means connected to be responsive to the different signal to provide a train of pulses at a frequency representing true mixing power;
    counter means connected to the third means for connecting the pulses as provided by the third means;
    externally programmable reference means responsive to external control manifestations and providing presettable digital reference signals representing predetermined mixing states in terms of work needed to obtain said state;
    means connected to the programmable reference means to provide thereto corrective values representing deviations of said predetermined work, so as to modify said reference signals;
    comparator means connected to said reference means, and said counter means for controlling the duration of mixing in response to agreement between the digital reference signals provided by the reference means and the state of the counter;
    means for sensing the temperature of the mixture in the chamber; and
    means connected to the means for sensing, for controlling the mixing operation in additional dependency upon temperature of the substance being mixed to reduce mixing power as expanded in the case of detecting a predetermined excess temperature.

2. In an apparatus as in claim 1, wherein the reference means is presettable to be responsive to plural different control manifestations; the comparator means providing different control operations when the counter reaches different count states corresponding to the different reference values.

3. In an apparatus as in claim 2, wherein one of the control operations is a change of speed of the motor, another one is the termination of mixing.

4. In an apparatus as in claim 1, wherein the means for controlling controls the speed of the motor.

5. In an apparatus as in claim 1, wherein the mixing chamber and the material therein is acted upon by a plunger, the means for controlling releaving plunger exerted pressure on the material when the temperature exceeds a prescribed limit.

6. In an apparatus as in claim 1, wherein the reference means includes a card reader for reading cards constituting the control manifestations for the stored reference signals.

* * * * *